United States Patent
Mitchell et al.

(10) Patent No.: US 8,630,514 B2
(45) Date of Patent: Jan. 14, 2014

(54) SPECTRAL BROADENING FOR DTS APPLICATION

(75) Inventors: Ian Bradford Mitchell, Austin, TX (US); Mikko Jaaskelainen, Katy, TX (US); Etienne M. Samson, Cypress, TX (US); John L. Maida, Jr., Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 120 days.

(21) Appl. No.: 13/396,597

(22) Filed: Feb. 15, 2012

(65) Prior Publication Data

US 2013/0209029 A1 Aug. 15, 2013

(51) Int. Cl.
- *G02B 6/00* (2006.01)
- *G01D 5/353* (2006.01)
- *G01K 11/32* (2006.01)

(52) U.S. Cl.
CPC ........ *G01D 5/35387* (2013.01); *G01D 5/35383* (2013.01); *G01D 5/353* (2013.01); *G01K 11/32* (2013.01)
USPC .................... 385/12; 358/31; 358/39; 358/48

(58) Field of Classification Search
CPC ... G01K 11/32; G01D 5/353; G01D 5/35383; G01D 5/35387
USPC ............................................................ 385/12
See application file for complete search history.

(56) References Cited

U.S. PATENT DOCUMENTS

| | | | |
|---|---|---|---|
| 4,879,763 A | 11/1989 | Wood | |
| 5,060,202 A | 10/1991 | Meek et al. | |
| 6,646,786 B1 * | 11/2003 | Meli et al. | 359/334 |
| 7,628,531 B2 | 12/2009 | Lee et al. | |
| 2006/0120418 A1 * | 6/2006 | Harter et al. | 372/30 |
| 2010/0128756 A1 | 5/2010 | Lee et al. | |
| 2010/0210952 A1 * | 8/2010 | Taira et al. | 600/476 |

OTHER PUBLICATIONS

John M. Dudley, et al., Supercontinuum Generation in Photonic Crystal Fiber, Reviews of Modern Physics, Oct.-Dec. 2006, 1135, vol. 78, The American Physics Society.

Jae-Min Lee, et al., Reduction of Rayleigh Back-Scattering Noise Using RF Tone in ROSA Based Bidirectional Optical Link, Presented at NFOEC Conference 2008, paper JThA98.

* cited by examiner

*Primary Examiner* — Ryan Lepisto
(74) *Attorney, Agent, or Firm* — Michael A. Ervin; John W. Wustenberg; Krueger Iselin LLP

(57) ABSTRACT

An apparatus and method for use in distributed temperature sensing (DTS) systems to reduce coherent Rayleigh scattering in fiber optic cables by using photonic crystal fibers.

6 Claims, 3 Drawing Sheets

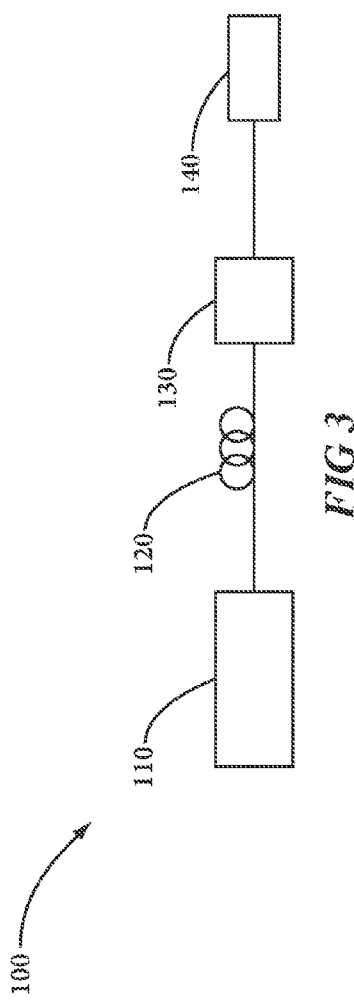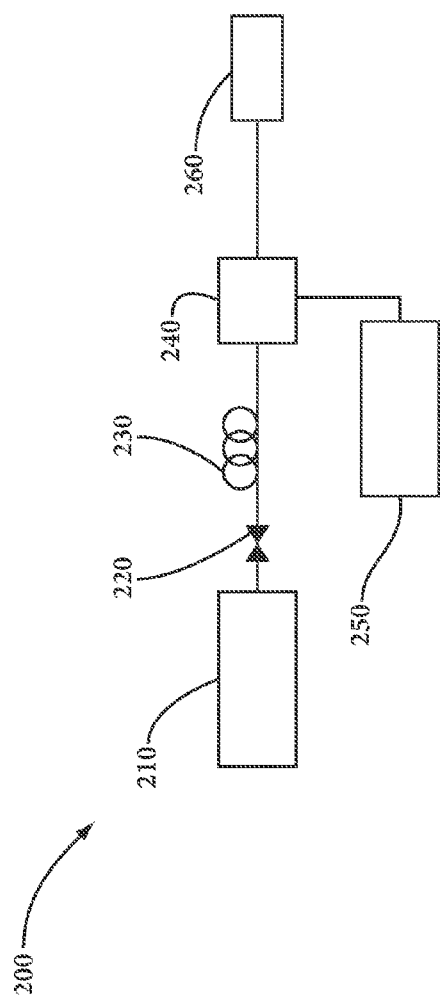

SPECTRAL BROADENING FOR DTS APPLICATION

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present disclosure relates to reduction of noise in distributed temperature sensing (DTS) systems.

BACKGROUND OF THE INVENTION

For several years, fiber optic sensors, and in particular DTS systems, have provided higher bandwidth, inherently safe operation (no generation of electric sparks), and immunity from EMI (Electromagnetic Interference) for parameter measurements.

For example, the temperature profile parameter and other parameter profiles along the fiber can be monitored. The resulting distributed measurement is equivalent to deploying a plurality of conventional point sensors, which would require more equipment and increase operational costs. Each conventional electrical point sensor would require multiple electrical leads and this would add to a large and expensive cable bundle as the number of point sensors increase.

When an optical fiber is excited with a laser light having a center wavelength $\lambda$, most of the light is transmitted. However, small portions of incident light $\lambda$ and other excited components are scattered backward and forward along the fiber. The amplitude of the other excited components depends on the intensity of the light at center wavelength $\lambda$ and the properties of the optical fiber. In the measurement of distributed temperature using Raman scattering, three components are of particular interest. The three components are Rayleigh back-scattered light, which will have a similar wavelength $\lambda$ as the original laser wavelength, Raman Stokes and Raman anti-Stokes components which have longer and shorter wavelengths than the original wavelength $\lambda$. These three components can be separated by optical filters and received by photo detectors to convert light to electrical signals. A ratio between the temperature sensitive Raman anti-Stokes intensity to the temperature insensitive Rayleigh or largely temperature insensitive Raman Stokes intensity forms the basis of a Raman based distributed temperature measurement.

Light traveling through a dielectric medium experiences natural scattering through small, random fluctuations in the index of refraction (known as Rayleigh scattering). When highly coherent light propagates through a medium with a large number of scattering sites multiple photons may interfere provided they are scattered in a small volume and are sufficiently in phase (known as coherent Rayleigh scattering or CRS). Over long distances this effect manifests itself as a noise envelope surrounding the natural Rayleigh backscattered signal that reduces the performance of any system attempting to use the signal for calculation.

In practice, high peak laser power and narrow spectral line width are necessary for the observation of CRS. As multi-wavelength Raman and Brillouin based Distributed Temperature Sensors (DTS) attempt to reach longer distances and higher accuracy, laser power has necessarily increased making CRS a commonly observed problem.

Lee, Lee, Won, Park, and Han: "Reduction of Rayleigh Back-Scattering Noise Using RF Tone in RSOA Base Bidirectional Optical Link" [OFC/NFOEC 2008] describes one approach for dealing with this issue by using a reflective semiconductor optical amplifier (RSOA) in optical network units and adding an RF tone into the RSOA.

What is needed is a new approach that simply reduces CRS in DTS systems to enable the use of higher primary laser powers in pursuit of longer range DTS systems.

BRIEF SUMMARY OF THE INVENTIVE CONCEPT

The need is met with the inventive step described herein. The concept is to use highly non-linear fiber possibly in conjunction with cross phase modulation to exploit various non-linear optical effects that conspire to broaden the spectrum of the laser reducing coherence and thus mitigating CRS effects. The advent of a new class of optical waveguides in the form of photonic crystal fiber (PCF) in the late 1990's has led to a capability to generate a wide range of non-linear optical effects, including for example, modulation instability, self modulation, stimulated Raman scattering, and four wave mixing. Dudley, Gentry, and Coen: "Supercontinuum Generation in Photonic Crystal Fiber" [Reviews of Modern Physics, Volume 78, Oct.-Dec. 2006] describes many of these effects.

In one aspect a length of photonic crystal fiber (PCF) is placed in the laser path to act as a broadening catalyst. Following the fiber is a set of attenuators and WDM filters to obtain the desired power and spectral selection. By passing the laser light through photonic crystal fiber modulation instability, self modulation, stimulated Raman scattering, and four wave mixing occur in various complementary and competing fashions to generate a broad spectrum, thereby automatically reducing the CRS effect. In another aspect the same system is employed with the addition of a second high power laser operating in continuous wave mode propagating through the photonic crystal fiber with the primary source. In this instance cross phase modulation acts in addition to the above mentioned non-linear effects to intensify the broadening effects.

BRIEF DESCRIPTION OF THE DRAWINGS

FIG. 3 is a block diagram of one system configured to create spectral broadening of a Rayleigh signal.

FIG. 4 is a block diagram of another system configured to create spectral broadening of a Rayleigh signal.

DETAILED DESCRIPTION OF THE INVENTION

In the following detailed description, reference is made accompanying drawings that illustrate embodiments of the present invention. These embodiments are described in sufficient detail to enable a person of ordinary skill in the art to practice the invention without undue experimentation. It should be understood, however, that the embodiments and examples described herein are given by way of illustration only, and not by way of limitation. Various substitutions, modifications, additions, and rearrangements may be made without departing from the spirit of the present invention. Therefore, the description that follows is not to be taken in a limited sense, and the scope of the present invention is defined only by the appended claims.

Figure 1:
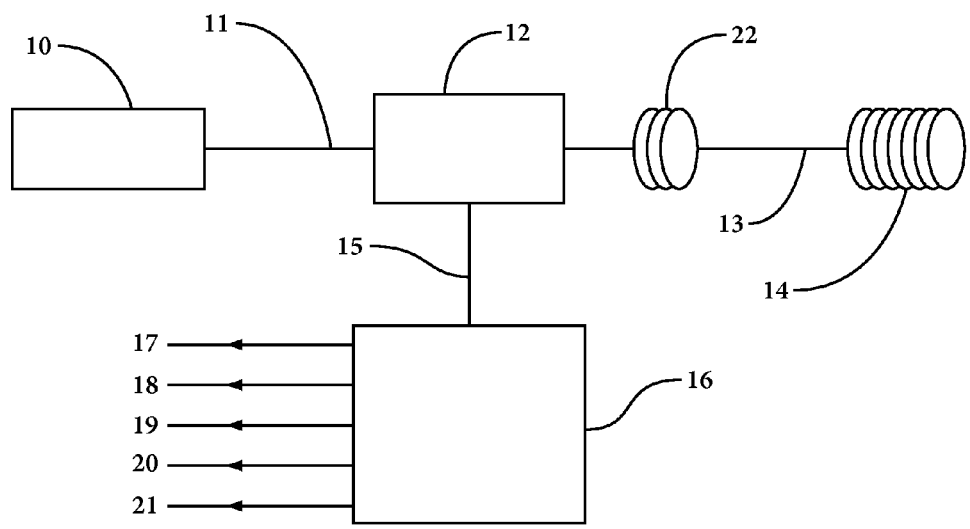
FIG. 1 is a block diagram of one example of a distributed temperature sensing system.
Figure 2:
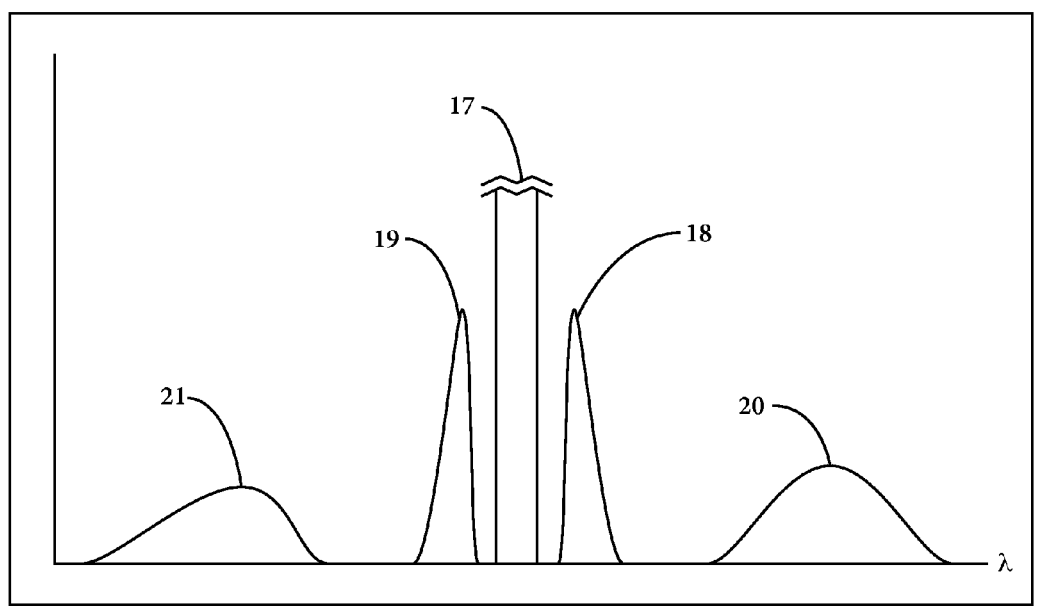
FIG. 2 exhibits some of the typical spontaneous backscattered Raman signals received from a distributed temperature sensing system.

FIG. 1 illustrates a conventional DTS system, including a light source 10, a lead light fiber 11, a light splitter and combiner 12, lead fiber 13, a sensing fiber 14, optical spectrum separator 16, and a reference fiber coil 22. Light source 10 provides optical signal through lead fiber 11 which may reach sensing fiber 14 via light splitter/combiner 12, reference fiber coil 22, and lead fiber 13. During the transmission of optical signal to sensing fiber 14, a portion of the light may be scattered and may travel back to optical spectrum separator 16 via lead fiber 13 and light splitter/combiner 12, and fiber 15. The backscattered light from the sensing fiber may include light components such as Rayleigh component 17 (same center wavelength as injected light), Brillouin Stokes component 18 and Brillouin Anti-Stokes component 19, Raman Stokes component 20, and Raman Anti-Stokes component 21, all of which may be separated via optical spectrum separator 16. Raman Stokes 20 and Raman anti-Stokes 21 (collected Raman scatterings) may be shifted from the input wavelength of the optical signal and be mirror imaged about Rayleigh component 17, as shown in FIG. 2.

Reference fiber coil 22 of the DTS system may be used as a reference profile for the entire temperature profile of the sensing fiber. For other profiles, reference fiber coil 22 may be used as a reference point to compare or analyze measured points.

In one embodiment, the Raman components may be used to determine parameter profiles such as temperature profiles. The Raman Stokes and Raman Anti-Stokes band are typically separated by more than tens of nanometers, whereas Brillouin components 18 and 19 are much closer—less than 0.1 nanometer from the Rayleigh bandwidth, as shown in FIG. 2. In particular, the temperature may be inversely proportional to the intensity of Raman Stokes component 20 over the intensity of Raman Anti-Stokes component 21.

FIG. 3, shown generally as the numeral 100, shows a block diagram of an embodiment of the inventive concept. In this embodiment the laser source 110 is fed into a fiber optic cable and a photonic crystal fiber (PCF) 120 is placed along the laser path to act as a broadening catalyst. Photonic fiber crystals are a class of optical fibers based on photonic crystals. The highly non-linear optical effects of PCF's result in a broadening of the spectrum of the laser reducing coherence and as a result mitigate coherent Rayleigh scattering (CRS). Some of the non-linear responses include modulation instability, self modulation, stimulated Raman scattering, and four wave mixing. The combination of these effects in complementary and competing fashions result in a broader line width spectrum. A broader line width reduces coherence and therefor reduces CRS.

The resulting broadened signal is then sent into an attenuator system 130 and then fed into a wavelength division multiplexer (WMD) 140 before feeding into the a DTS system.

FIG. 4, shown generally as the numeral 200, shows an alternate embodiment for broadening the spectrum of a laser source. In this embodiment a primary laser source 210 still feeds through a photonic crystal fiber 230. In this second embodiment a second high power seed laser source 250 is added. This second laser source, operates in a continuous wave mode and counter propagates through the photonic crystal fiber along with the primary source. Second laser source 250 is combined with the other laser source in a wavelength division multiplexer 240, then feeds into an attenuator system 260 before feeding into a DTS system. A seed source wavelength block 220 is provided to prevent the seed source wavelength from entering primary source 210.

Figure 5:
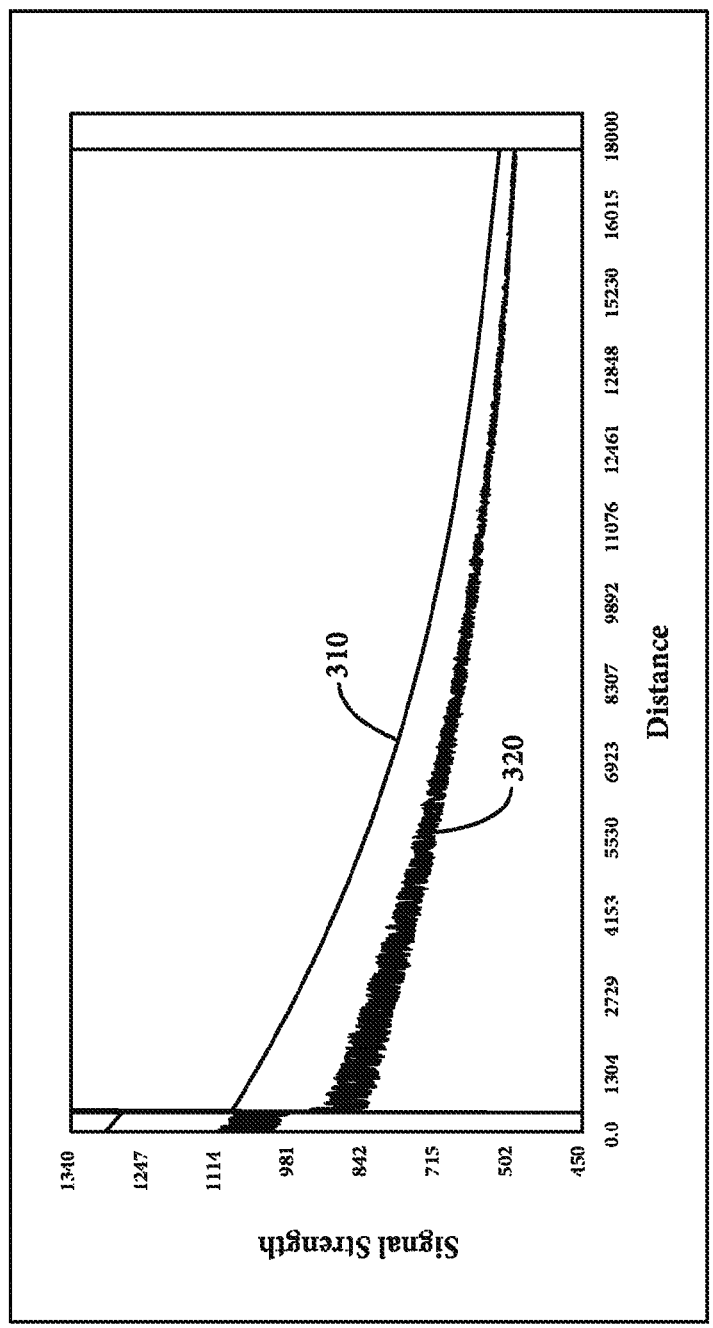
FIG. 5 is a graphical representation of the effect of the inventive concept on the Rayleigh signal quality.

FIG. 5, shown generally as the numeral 300, now demonstrates a typical effect of the spectral broadening configurations of either the embodiment of FIG. 3 or the embodiment of FIG. 4. The plot is of the signal strength of backscattered Rayleigh laser signal versus distance (in meters) in an extended DTS sensing system. Curve 320 is a backscattered Rayleigh signal from a normal DTS system, exhibiting the typical noise envelope surrounding a backscattered Rayleigh signal in longer distance applications. This noise envelope can reduce the performance of any system attempting to use the Rayleigh backscattered signal for measurement or calibration. Curve 310 represents a backscattered Rayleigh signal resulting from the reduction in coherent Rayleigh scattering possible from either of the proposed spectral broadening schemes.

Modern dual laser Raman DTS calculation methods, such as described in U.S. Pat. No. 7,628,531 or U.S. Publication 201010128756A1 offer a new capability to self correct for dynamically changing differences in signal attenuation that can result from fiber damage during and after installation as well as losses from hydrogen ingression. These are prevalent in Oil and Gas application. But when seeking higher power, greater distance, and higher resolution it often becomes necessary to collect the Rayleigh signal as part of the DTS calculation routine. With the ability described here for reducing the noise contribution from the Rayleigh signal it now will be possible to create DTS systems with unsurpassed reach (distance) and resolution with the addition of self correcting for difference in attenuation in harsh environments.

Although certain embodiments of the present invention and their advantages have been described herein in detail, it should be understood that various changes, substitutions and alterations can be made without departing from the spirit and scope of the invention as defined by the appended claims. Moreover, the scope of the present invention is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufactures, means, methods or steps.

The invention claimed is:

1. An apparatus for use in a distributed temperature sensing systems for reducing coherent Rayleigh scattering in the distributed temperature sensing system comprising:
   a. a photonic crystal fiber for receiving a light signal from a fiber optic cable in communication from a primary light source of the distributed temperature sensing system;
   b. a system of attenuators for receiving the light signal from a fiber optic cable in communication from the photonic crystal fiber; and
   c. a wavelength division multiplexer for receiving the light signal from a fiber optic cable in communication with said system of attenuators, and for passing the resulting signal into the sensing fiber of the distributed temperature sensing system.

2. The apparatus of claim 1 wherein said primary light source is a 1064 nanometer laser.

3. An apparatus for use in a distributed temperature sensing systems for reducing coherent Rayleigh scattering in the distributed temperature sensing system comprising:
   a. a photonic crystal fiber for receiving a light signal from a fiber optic cable in communication from a primary light source of the distributed temperature sensing system;
   b. a wavelength division multiplexer for receiving the light signal from a fiber optic cable in communication from the photonic crystal fiber;
   c. a secondary continuous wave seed source laser for feeding into said wavelength division multiplexer;
   d. a system of attenuators receive for receiving the light signal from a fiber optic cable in communication with said system of attenuators, and for passing the resulting signal into the sensing fiber of the distributed temperature sensing systems.

4. The apparatus of claim 3 wherein said primary light source is a 1064 nanometer laser and said second continuous wave seed source is a 975 nanometer laser.

5. A method for reducing coherent Rayleigh scattering in a distributed temperature sensing system comprising the steps of:
   a. feeding a primary light source for the distributed temperature sensing system through a photonic crystal fiber;
   b. feeding the resultant light from said photonic crystal fiber through a system of attenuators;
   c. feeding the resultant light from the system of attenuators to a wavelength division multiplexer; and
   d. feeding the resultant light from the wavelength division multiplexer into the sensing fiber of the distributed temperature sensing system.

6. A method for reducing coherent Rayleigh scattering in a distributed temperature sensing system comprising the steps of:
   a. feeding a primary light source for the distributed temperature sensing system through a photonic crystal fiber;
   b. feeding the resultant light from said photonic crystal fiber to a wavelength division multiplexer;
   c. feeding a secondary light source into said wavelength division multiplexer, allowing its signal to mix with the primary signals from the primary light source in the photonic crystal fiber;
   d. feeding the resultant light from the wavelength division multiplexer to a system of attenuators; and
   e. feeding the resultant light from the system of attenuators into the sensing fiber of the distributed temperature sensing system.

* * * * *